UNITED STATES PATENT OFFICE.

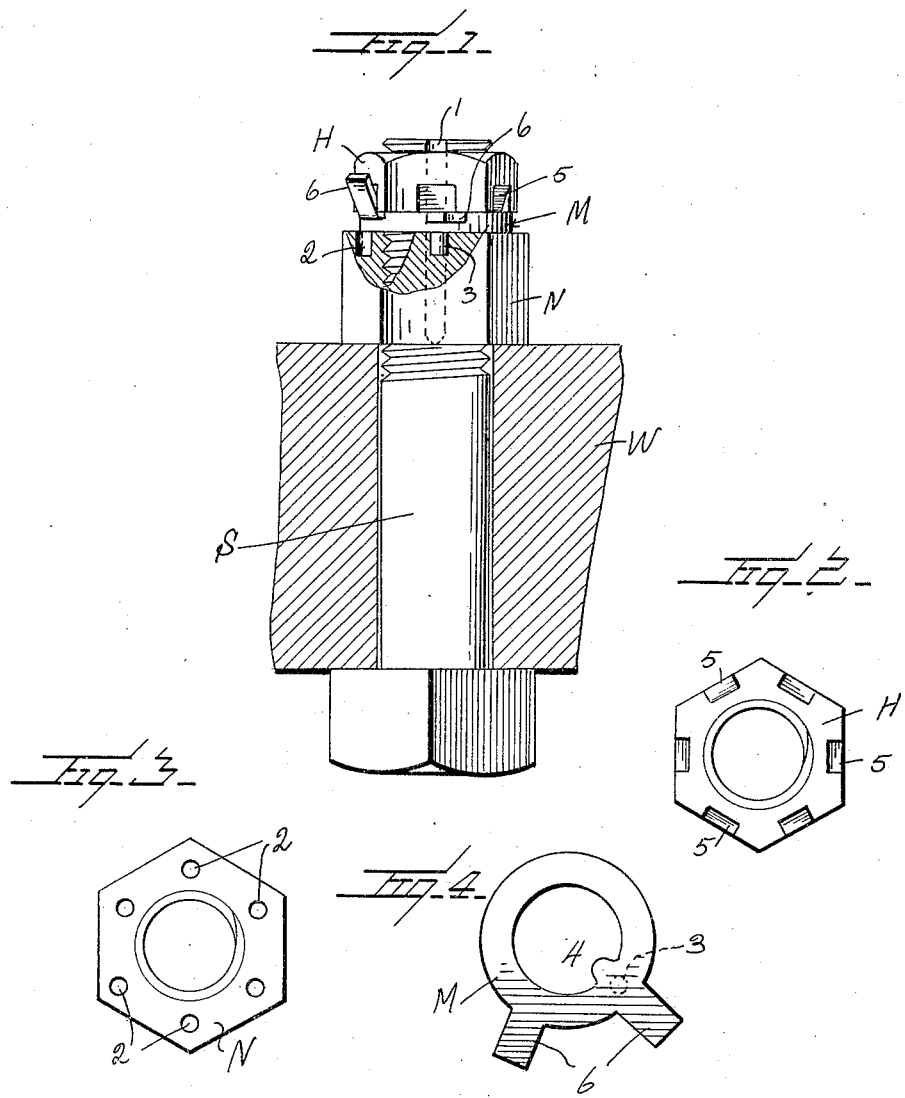

LOGA ALEXANDER, OF ALLIANCE, OHIO, ASSIGNOR OF ONE-HALF TO MORRIS A. SCOTT, OF ALLIANCE, OHIO.

NUT-LOCK.

1,363,210.  Specification of Letters Patent.  Patented Dec. 28, 1920.

Application filed June 30, 1919. Serial No. 307,570.

*To all whom it may concern:*

Be it known that I, LOGA ALEXANDER, a citizen of the United States, residing at Alliance, in the county of Stark and State of Ohio, have invented certain new and useful Improvements in Nut-Locks, of which the following is a specification, reference being had to the accompanying drawings.

This invention relates to certain improvements in nut locks and has relation more particularly to a device of this general character wherein the nut and bolt are effectively coupled one to the other.

It is also an object of the invention to provide a novel and improved lock nut embodying a washer adapted to be positioned upon the bolt and locked thereto between a pair of nuts threaded upon the bolt and wherein the opposed faces of the nuts and the washer are provided with coacting means for holding the nuts against retrograde movement.

The invention consists in the details of construction and in the combination and arrangement of the several parts of my improved nut lock whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view partly in elevation and partly in section illustrating a nut lock constructed in accordance with an embodiment of my invention.

Fig. 2 is a view in bottom plan of the outer nut as disclosed in Fig. 1.

Fig. 3 is a view in top plan of the inner nut as disclosed in Fig. 1, and

Fig. 4 is a view in plan of the lock washer with a pin carried thereby indicated by dotted lines.

As disclosed in the accompanying drawings, S denotes the shank of a bolt having its threaded end portion provided with a longitudinally disposed groove or channel 1 open at its outer end.

N denotes a nut applied to the shank S and adapted to engage the work W and the outer face of the nut N is provided in its peripheral portion with a plurality of equi-distantly spaced sockets 2 in one of which is adapted to be seated a pin 3 carried by the washer member M.

The washer member M is provided with an inwardly directed lug or tongue 4 which seats within the groove or channel 1 whereby the member M when applied is held against movement around the shank S so that with the pin 3 seated within the socket 2 of the nut N said nut is also locked against rotation and particularly against retrograde movement.

H denotes a holding nut threaded upon the shank S outwardly of the washer member M and the inner face of said nut H is provided in its periphery with a series of equi-distantly spaced notches or recesses 5 having their base walls beveled.

Radiating from the washer member M are a pair of tongues 6 spaced apart a distance less than the space between a pair of adjacent notches or recesses 5. After the nut H has been properly applied with respect to the member M one of the tongues 6 is bent to engage within the recess or notch 5 so that the holding nut H is also effectively locked by the washer member M against retrograde movement.

In order to remove the nut N the tongue 6 is removed from within the notch or recess 5 whereupon the holding nut H can be readily removed and after the nut H has been removed the washer member M can be lifted off the shank S. With the washer member M free, the nut H can be readily rotated. By having the tongues 6 spaced apart a distance less than the space between the adjacent notches or recesses 5 of the nut H, the second tongue 6 is held against bending so that should the first tongue 6 become fractured or otherwise unfit for use, the washer member M can be further used in connection with the second tongue 6. By having the tongues 6 in this relative arrangement it is also to be understood that the holding nut N can be locked against rotation and particularly retrograde movement without giving to the holding nut N a full turn, or in other words, by having the tongues 6 spaced apart a distance less than the space between a pair of recesses or notches 5 it is possible to lock the holding nut N at a point less than the space between a pair of adjacent notches or recesses 5 and which would not otherwise be possible if a single tongue 6 were employed unless the washer member M is rotated about the shank S. However, with the washer member M clamped between the nuts N and H this rotation of the washer member M can be obtained.

From the foregoing description, it is thought to be obvious that a nut lock constructed in accordance with my invention is particularly well adapted for use by reason of the convenience and facility with which it may be assembled and operated and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A nut lock comprising, in combination, a shank, a washer member surrounding said shank and having a pair of tongues extending outwardly therefrom and substantially radial, said washer member being provided with means for holding the same against rotation, and a nut threaded upon the shank, said nut having its inner face provided in its periphery with a series of spaced notches into which a tongue of the washer member is adapted to seat, one of said tongues being out of register with a notch when a second tongue is seated within a notch.

2. A nut lock comprising, in combination, a shank provided with a longitudinally disposed groove in its periphery, a washer member surrounding the shank and provided with an inwardly directed tongue seated within the groove of the shank, said washer member being also provided with a pair of outstanding bendable tongues substantially radiating therefrom, and a nut engageable with the shank and provided in a face with a plurality of spaced recesses, said tongues being adapted to seat within a notch of the nut, said tongues of the washer member being spaced apart a distance whereby one of the tongues is out of register with a notch of a nut when the second tongue is seated within a notch of a nut.

3. A nut lock comprising, in combination, a shank provided with a groove extending longitudinally thereof, a nut engageable with the shank, a washer member surrounding the shank outwardly of the nut and provided with an inwardly directed lug seated within the groove of the shank, a laterally directed pin carried by the washer member, the face of the nut opposed to the washer member being provided with a socket into which the pin seats, and a second nut engageable with the shank outwardly of the washer member, the inner face of said second nut being provided with a plurality of recesses, said washer member being provided with a pair of outstanding bendable tongues to seat within a notch of the second nut, said tongues being spaced apart a distance so that one of the tongues is out of register with a notch of the second nut when the second tongue is seated within a notch of the second nut.

In testimony whereof I hereunto affix my signature.

LOGA ALEXANDER.

Witness:
ROBERT A. BOSWELL.